FERROMAGNETIC SCREENING CAPS AND DEMAGNETIZING COILS FOR COLOR PICTURE TUBES HAVING RECTANGULAR DISPLAY SCREENS

Filed Jan. 7, 1966

INVENTORS
CONSTANTIUS J. W. PANIS
JAN M. OLTHUIS
BY
Frank R. Jifani
AGENT

Sept. 5, 1967 C. J. W. PANIS ETAL 3,340,417

FERROMAGNETIC SCREENING CAPS AND DEMAGNETIZING COILS FOR COLOR PICTURE TUBES HAVING RECTANGULAR DISPLAY SCREENS

Filed Jan. 7, 1966 2 Sheets-Sheet 2

INVENTORS
CONSTANTIUS J. W. PANIS
JAN M. OLTHUIS
BY
Frank R. Trifari
AGENT 3,340,417

FERROMAGNETIC SCREENING CAPS AND DEMAGNETIZING COILS FOR COLOR PICTURE TUBES HAVING RECTANGULAR DISPLAY SCREENS

Constantius Johannes Waltherus Panis and Jan Maximiliaan Olthuis, Emmasingel, Eindhoven, Netherlands, assignors to North American Philips Company, Inc., New York, N.Y., a corporation of Delaware Filed Jan. 7, 1966, Ser. No. 519,319
Claims priority, application Netherlands, Nov. 20, 1965, 65—15,107
4 Claims. (Cl. 315—8)

The invention relates to a ferromagnetic, substantially conical, screening cap suitable for being arranged around the cone of a color picture tube for television reproduction, said tube having a substantially rectangular display screen.

In picture tubes for reproducing color television images every electron beam at a given deflection must impinge upon a given color element of the fluorescent screen since a small deviation causes an incorrect reproduction of the colors. Therefore, the cone of the tube is generally surrounded by a ferromagnetic screen to shield against external magnetic fields. It has been found, however, that in the external shield, and in the ferromagnetic parts provided in the tube, in particular the color selection members and their suspension elements provided adjacent the fluorescent screens, variations in the magnetic resistance of the material can occur locally by interference fields as a result of which local discoloring of the images may occur. It has been found that said interferences can be caused by the use and the switching on and off of electrical apparatus in the proximity of the picture tube.

Although the tube and its screening cap, as well as the whole television apparatus, are demagnetized during the installation by means of an alternating current field which gradually decreases in strength, it has been found that local magnetizations can occur again as a result of the above causes. In addition the components of the terrestrial magnetic field, which extend parallel to earth, are the cause that the television apparatus has to be demagnetized again each time when its direction or position is varied.

The demagnetization can be effected automatically each time the television apparatus is switched on. For that purpose, for example, two separate ring coils are arranged on or near the parts of the ferromagnetic screening cap which cover the side walls of the picture tube. In this case, each ring coil preferably extends near the edge of the wide end of the screening cap partially parallel to the side of the image plane and partially according to a generatrix of the conical part of the cap towards the narrow end and along the edge thereof. The cap constitutes as it were the core of the coils since the coils are each secured partially on the outer surface and partially on the inner surface of the cap. In the center of the long side of the rectangle of the cap auxiliary coils are provided. Therefore, the screening cap must be divided to provide said auxiliary coils. The number of ampere-turns required is approximately 750, but after a few cycles of the alternating current the current may be reduced to substantially zero.

However, the use of auxiliary coils and a divided cap is complicated and consequently expensive.

It has been found that the above drawbacks can be avoided if each of the ring coils, before following the generatrix of the conical part of the cap, extends along the edge of the cap parallel to the upper and lower sides of the display screen over a distance which is at least one-sixth and at most one-third of the length of the long sides of the display screen. Two ring coils provided in this manner can produce a more even demagnetizing effect with the same number or fewer ampere turns while no auxiliary coils are required so that the cap need not be divided. The parts of each ring coil which extend parallel to the long sides of the display screen are preferably secured against the inner surface of the cap. Only the part of each coil which extends parallel to the side of the picture screen is arranged on the outer surface of the cap. Since the corners of the wide end of the cap must be provided with recesses so as not to cover the lugs of the connection means of the picture tube, no additional gaps are required for inserting the coils towards the inner surface.

A particularly favorable construction is obtained if the cap adjoins and cooperates with an anti-implosion band consisting of ferromagnetic material which is arranged around the wide part of the bulb of the tube.

The invention will now be described in greater detail, with reference to the accompanying drawings, in which FIG. 1 is a perspective view of a cap according to the invention, of which FIG. 2 shows the direction of the magnetic field over the wide open end of the screening cap;

FIG. 3 shows another embodiment according to the invention, of which

Figure 1:
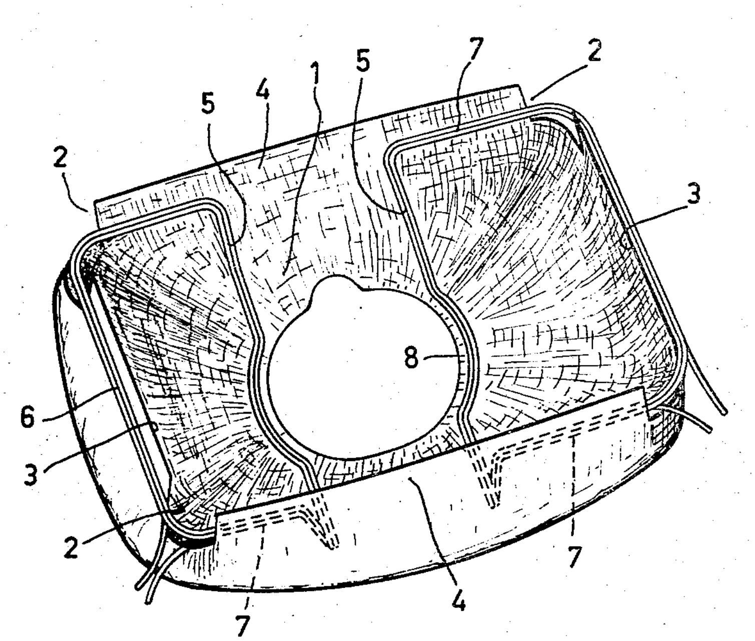

In FIG. 1, reference numeral 1 denotes a substantially conical cap of ferromagnetic material, the wide end of which is provided with recesses 2 as a result of which projecting portions 3 and 4 are formed. The portions 3 engage the short vertical sides of the image plane when the cap is provided on a picture tube. The ring coils are provided in such a manner that a part 6 of each coil extends parallel to the sides of the display screen on the outer surface of the cap. According to the invention the coils do not extend directly to the corners according to a generatrix of the conical cap 1 toward the narrow end 8, but first with the parts 7 on the inner side of the cap parallel to the long sides of the display screen over a distance which is ⅙ to ⅓ of the length of said long sides.

Figure 2:
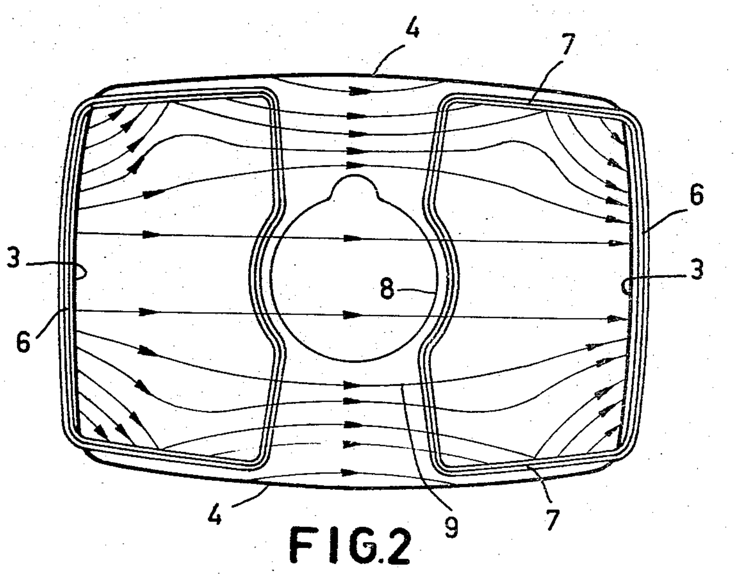

As is shown in FIG. 2, an even horizontal magnetic field 9 is produced by said coils which not only removes local magnetisations of the said ferromagnetic components of the tube, but also removes interferences which are the result of placing the apparatus in a different position and which are caused by a change of the direction of the apparatus with respect to the horizontal components of the terrestrial magnetic field.

Figure 3:
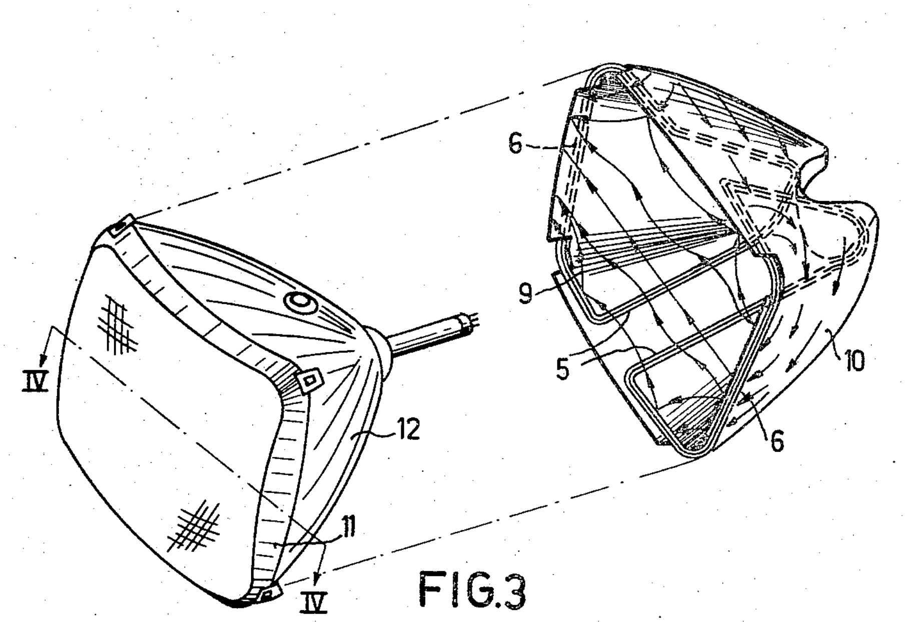
Figure 4:
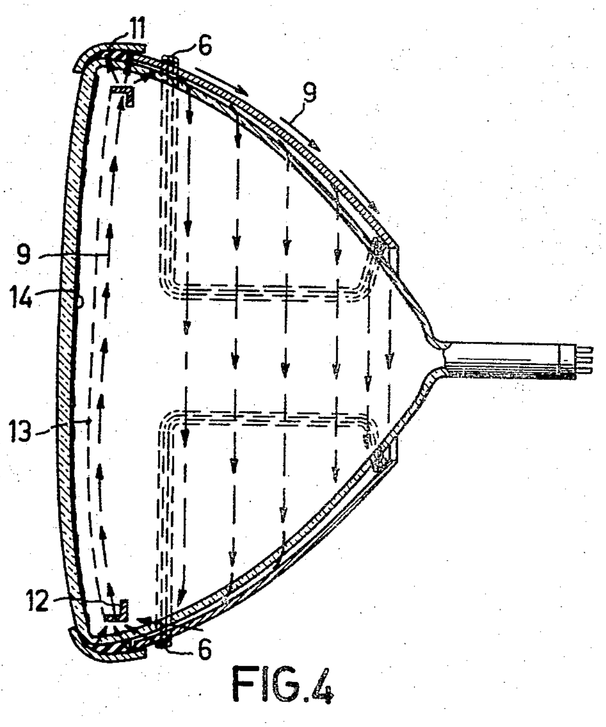
FIG. 4 shows the direction of the magnetic field in a horizontal cross section of a cap with associated picture tube.

A particularly favorable embodiment is obtained if the screening cap 10 (FIG. 3) cooperates with an anti-implosion band 11 which is arranged around the bulb of the tube 12. If the band 11 does not exert pressure on the bulb it may consist of a soft ferromagnetic material and serve as a pole shoe for the cap 10. In this case the cap 10 may be much lower so that the parts 6 of the coils 5 become located inside the profile of the largest cross section of the picture tube as is shown in FIG. 4. As a result of this the coils have no influence on the installation dimensions of the tube in the cabinet of the apparatus. In addition, this embodiment does not exhibit the adverse influence of recesses on the screening action at the corners of the cap as shown in FIG. 1.

As shown in FIG. 4, the magnetic field produced by the coils 5 extend through the anti-implosion band 11 to the supporting ring 12 of the color selection electrode 13 and through said electrode 13 to the other side of the display screen 14.

Since the vertical component of the magnetic field has no disturbing influence when the direction in which the receiver is placed is varied, said component need not be compensated for separately. It has been found that an amply sufficient demagnetisation is obtained if the coils 5 are arranged on the surface of the ferromagnetic screening cap in the manner described.

Alternatively it is possible to provide the coils entirely inside the screening cap but in this case the action is considerably less effective. By providing the coils partially on the inside and partially on the outside of the cap, the cap serves as a magnet core for the coils.

It is often desirable that the ribbon 11 be insulated electrically with respect to the cap 1. The edges of the cap and the ribbon may overlap one another for better closing of the magnetic circuit.

The alternating current with decreasing amplitude which must pass through the coils when the apparatus is switched on can be obtained in a comparatively simple manner from the switching-on current pulse of the apparatus by means of a known combination of current and voltage sensitive resistors.

What is claimed is:

1. A ferromagnetic, substantially conical, screening cap suitable for being arranged around the cone of a color television picture tube, and individual ring coils provided about said cap for demagnetizing ferromagnetic screening means provided around the picture tube and color selection members arranged in the picture tube in the proximity of the display screen, each ring coil being arranged partially near the edge of the wide end of the cap, parallel to a side of the image plane, on the outside of the cap and partially according to a generatrix of the conical part of the cap towards the narrow end of the cap and along the edge of said end, each of said coils extending along the edge of the wide end of the cap parallel to the upper and lower sides of the display screen over a distance which is at least ⅙ and at most ⅓ of the length of the long sides of the display screen.

2. A screening cap as claimed in claim 1 in which the parts of each ring coil which extend parallel to the long sides of the display screen are secured against the inner side of the screening cap.

3. A screening cap as claimed in claim 1 in which the screening cap is joined magnetically to an anti-implosion band which is secured around the part of the bulb of the picture tube having the largest cross section.

4. A color television picture tube as claimed in claim 3 in which the parts of the demagnetizing coils which are arranged on the outer side of the screening cap are located inside the profile of the picture tube.

No references cited.

JAMES W. LAWRENCE, *Primary Examiner.*

R. SEGAL, *Assistant Examiner.*